(12) United States Patent
Casey et al.

(10) Patent No.: US 10,764,638 B2
(45) Date of Patent: *Sep. 1, 2020

(54) METADATA SYSTEM FOR REAL-TIME UPDATES TO ELECTRONIC PROGRAM GUIDES

(71) Applicant: CenturyLink Intellectual Property LLC, Denver, CO (US)

(72) Inventors: Steven M. Casey, Littleton, CO (US); Felipe Castro, Erie, CO (US); Ronnie S. Dhaliwal, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,389

(22) Filed: May 29, 2018

(65) Prior Publication Data

US 2018/0279000 A1 Sep. 27, 2018

Related U.S. Application Data

(63) Continuation of application No. 15/135,173, filed on Apr. 21, 2016, now Pat. No. 9,992,540, which is a
(Continued)

(51) Int. Cl.
*H04N 21/462* (2011.01)
*H04N 21/482* (2011.01)
(Continued)

(52) U.S. Cl.
CPC ....... *H04N 21/4622* (2013.01); *H04N 21/236* (2013.01); *H04N 21/237* (2013.01); *H04N 21/25891* (2013.01); *H04N 21/26283* (2013.01); *H04N 21/4312* (2013.01); *H04N 21/4345* (2013.01); *H04N 21/44* (2013.01); *H04N 21/462* (2013.01); *H04N 21/4722* (2013.01); *H04N 21/4782* (2013.01); *H04N 21/482* (2013.01); *H04N 21/8126* (2013.01); *H04N 21/8133* (2013.01); *H04N 21/84* (2013.01); *H04N 21/8586* (2013.01)

(58) Field of Classification Search
CPC .............. H04N 21/236; H04N 21/237; H04N 21/25891; H04N 21/26283; H04N 21/462; H04N 21/4622; H04N 21/4722; H04N 21/4782; H04N 21/482; H04N 21/8126; H04N 21/8133

See application file for complete search history.

(56) References Cited

U.S. PATENT DOCUMENTS 6,268,849 B1 * 7/2001 Boyer ................ H04N 7/17318
725/40
8,578,416 B1    11/2013 Radloff
(Continued)

*Primary Examiner* — Jeremy S Duffield

(57) ABSTRACT

Novel tools and techniques to enable more robust electronic program guides in television distribution systems. Some solutions can obtain data (e.g., from the Internet) about a program listed on an electronic program guide and integrate that data with electronic program guide. In some cases, this information can be obtained and/or updated dynamically, in real-time or near real-time, for example to provide, up-to-date information can be provided in the electronic program guide, rather than requiring the viewer to tune to an information channel. In some cases, the system can provide a generalized electronic program guide that can be rendered by the system to be displayed on a plurality of different devices.

17 Claims, 4 Drawing Sheets

Related U.S. Application Data continuation of application No. 13/622,168, filed on Sep. 18, 2012, now Pat. No. 9,351,043.

(51) Int. Cl.

| | |
|---|---|
| *H04N 21/4722* | (2011.01) |
| *H04N 21/4782* | (2011.01) |
| *H04N 21/81* | (2011.01) |
| *H04N 21/236* | (2011.01) |
| *H04N 21/237* | (2011.01) |
| *H04N 21/258* | (2011.01) |
| *H04N 21/84* | (2011.01) |
| *H04N 21/262* | (2011.01) |
| *H04N 21/431* | (2011.01) |
| *H04N 21/858* | (2011.01) |
| *H04N 21/434* | (2011.01) |
| *H04N 21/44* | (2011.01) |

(56) References Cited

U.S. PATENT DOCUMENTS

| | | |
|---|---|---|
| 9,351,043 B2 | 5/2016 | Casey et al. |
| 2002/0053084 A1 | 5/2002 | Escobar et al. |
| 2002/0184624 A1* | 12/2002 | Spencer ............ H04N 21/4126 725/39 |
| 2003/0005446 A1 | 1/2003 | Jaff et al. |
| 2005/0015803 A1* | 1/2005 | Macrae ............ H04N 5/44543 725/41 |
| 2006/0101338 A1* | 5/2006 | Kates ................ H04N 5/4403 715/716 |
| 2006/0265385 A1* | 11/2006 | Agrawal ........... G06F 17/30566 |
| 2008/0062318 A1* | 3/2008 | Ellis ................ H04N 5/44543 348/564 |
| 2008/0066123 A1 | 3/2008 | Igoe |
| 2009/0112930 A1 | 4/2009 | Anguiano |
| 2009/0150925 A1 | 6/2009 | Henderson |
| 2011/0283304 A1 | 11/2011 | Roberts et al. |
| 2011/0289419 A1 | 11/2011 | Yu et al. |
| 2012/0102526 A1* | 4/2012 | Lejeune ............ H04N 21/4622 725/42 |
| 2012/0174173 A1 | 7/2012 | Brood |
| 2013/0174035 A1* | 7/2013 | Grab ................ H04N 21/4316 715/716 |
| 2013/0227013 A1 | 8/2013 | Maskatia |
| 2013/0268974 A1* | 10/2013 | Sridhar ............ H04N 21/4126 725/51 |
| 2014/0082672 A1 | 3/2014 | Casey et al. |
| 2016/0241920 A1 | 8/2016 | Casey et al. |

\* cited by examiner

METADATA SYSTEM FOR REAL-TIME UPDATES TO ELECTRONIC PROGRAM GUIDES

CROSS-REFERENCES TO RELATED APPLICATIONS

This application is a continuation application of U.S. patent application Ser. No. 15/135,173, filed on Apr. 21, 2016 by Steven M. Casey et al., entitled, "Metadata System for Real-Time Updates to Electronic Program Guides," which is a continuation application of U.S. patent application Ser. No. 13/622,168 (now U.S. Pat. No. 9,351,043), filed on Sep. 18, 2012 by Steven M. Casey et al., entitled, "Metadata System for Real-Time Updates to Electronic Program Guides," the entire teachings of which are incorporated herein by reference in their entirety and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to television distribution services and more particularly, to enhanced electronic program guides for such services.

BACKGROUND

Many television providers provide an electronic program guide ("EPG") as a service to their subscribers. Initially, EPGs merely displayed a continuous listing of programs for subscribers on a specified channel. With advances in distribution systems, including especially the advent of digital distribution, EPGs became a navigational tool, allowing subscribers to select a program in the EPG to navigate to that channel (and/or set a recording for a future program). At the same time, many providers began adding additional information (such as detailed program information, promotional advertisements, etc.) to EPGs.

As a result, a typical EPG today generally provides a set of preprocessed data about current and/or upcoming programming. This data is loaded to the subscriber's set-top box ("STB") in large files—generally as a batch process during late-night hours and the like—for displaying anytime the EPG is requested before the next batch update. This technique, however, does not provide a way to add real-time data to the TV screen once the EPG metadata file is loaded in memory. Changes need to be pushed to the STB for new data updates, severely limiting the ability for an EPG to contain dynamic or real-time information.

Hence, there is a need for more robust techniques to provide EPGs to subscribers.

BRIEF SUMMARY

A set of embodiments provides tools and techniques to enable more robust electronic program guides in television distribution systems, which can include without limitation, cable television systems, satellite television systems, Internet Protocol television systems, terrestrial broadcast television systems, and/or the like. In an aspect, some embodiments obtain data (e.g., from the Internet) about a program listed on an electronic program guide and integrate that data with electronic program guide. In a particular aspect of certain embodiments, this information can be obtained and/or updated dynamically, in real-time or near real-time. In such embodiments, for example, up-to-date information can be provided in the electronic program guide, rather than requiring the viewer to tune to an information channel. In another aspect of some embodiments, the system can provide a generalized electronic program guide that can be rendered by the system to be displayed on a plurality of different devices (including without limitation, televisions, personal computers, tablet computers, wireless phones, and the like).

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments features methods of providing an electronic program guide to a viewer. An exemplary method might comprise obtaining, with a computer, an electronic program guide feed. In some aspects, such a feed might be obtained from a third party provider. In other aspects, the electronic program guide feed might comprise a plurality of program listings of broadcast television programs.

In some embodiments, the method might further comprise providing, with the computer, an application programming interface for adding enhanced metadata to the electronic program guide feed. The computer might obtain obtaining, e.g., with the application programming interface, enhanced metadata pertaining to a broadcast television program. The method, then, might include identifying, e.g., with the computer, one of the plurality of program listings corresponding to the broadcast television program, and/or integrating, again perhaps with the computer, the enhanced metadata with the identified program listing.

In some embodiments, the method further comprises formatting an electronic program guide from the electronic program guide feed. In an aspect, the electronic program guide might include the integrated enhanced metadata. The method can also include rendering a graphical display of the EPG for display on a display device. Merely by way of example, some methods might include determining a set of display characteristics for the display device, and rendering a graphical display guide might comprise rendering the graphical display guide to accommodate the set of display characteristics. This determination might include identifying the display device from among a plurality of display devices, such as a television set top box, a personal computer, a tablet computer, a wireless phone, and a remote control device, to name but a few examples.

In some cases, the enhanced metadata might include a hyperlink inserted into the electronic program guide and/or associated with the identified program listing. In such cases, a method might include causing the display device to display the graphical display guide, including the hyperlink, and/or receiving a user selection of the hyperlink. In some cases, the method might include, in response to receiving the user selection of the hyperlink, causing the display device to display the enhanced metadata, and/or causing a second display device to display the enhanced metadata. In other cases, the enhanced metadata might include textual and/or graphical information inserted into the electronic program guide and/or associated with the identified program listing.

An apparatus provided by other embodiments might comprise a non-transitory computer readable medium having encoded thereon a set of instructions executable by one or more computers to perform one or more operations, including without limitation instructions for performing methods (or portions thereof) provided by other embodiments.

Merely by way of example, in one embodiment, the set of instructions might comprise instructions to obtain an electronic program guide feed from a third party provider, the electronic program guide feed comprising a plurality of program listings of broadcast television programs and/or instructions to provide an application programming interface for adding enhanced metadata to the electronic program guide feed. The set of instructions might further comprise instructions to obtain, with the application programming interface, enhanced metadata pertaining to a broadcast television program, instructions to identify one of the plurality of program listings corresponding to the broadcast television program, and/or instructions to integrate the enhanced metadata with the identified program listing. In some cases, the set of instructions could also include instructions to format an electronic program guide from the electronic program guide feed, the electronic program guide including the integrated enhanced metadata, and/or instructions to render a graphical display of the electronic program guide for display on a display device.

A computer system provided by other embodiments might comprise one or more processors a non-transitory computer readable medium in communication with the one or more processors, the computer readable medium having encoded thereon software executable by the computer system to perform one or more operations. In some cases, the software might comprise a set of instructions, such as those described above. In another aspect of some embodiments, the software might comprise a plurality of modules.

Merely by way of example, in one embodiment, the software might comprise a receiver module to obtain an electronic program guide feed from a third party provider, the electronic program guide feed comprising a plurality of program listings of broadcast television programs. The software might further comprise an application programming interface module to obtain enhanced metadata pertaining to a broadcast television program and/or an integrator module to identify one of the plurality of program listings corresponding to the broadcast television program and integrate the enhanced metadata with the identified program listing. The software, in some embodiments, could include an electronic program guide formatter module to format an electronic program guide from the electronic program guide feed, the electronic program guide including the integrated enhanced metadata. In further embodiments, the software might include a renderer module to render a graphical display of the electronic program guide for display on a display device.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
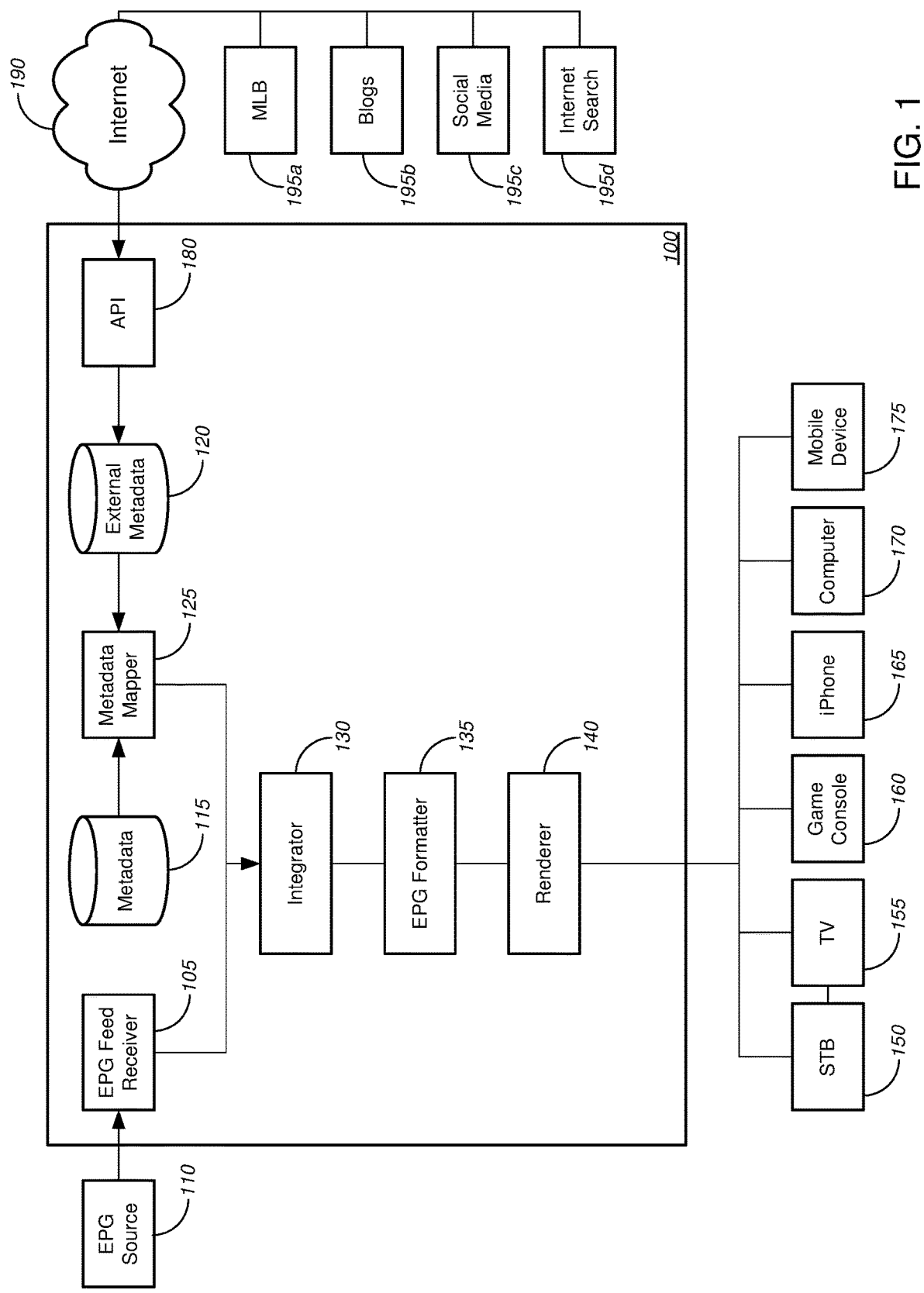
FIG. 1 is a block diagram illustrating a system for providing electronic program guides with enhanced metadata, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Embodiments can include systems, methods, software, tools and techniques to enable more robust electronic program guides ("EPG") in television distribution systems. Such distribution systems vary widely in different embodiments and can include, without limitation, cable television systems, satellite television systems, Internet Protocol television systems, terrestrial broadcast television systems, and/or the like. Accordingly, various embodiments can be used in a wide variety of broadcast, multicast and/or unicast environments. In fact, while many embodiments can be implemented within (and/or in conjunction with) a set-top box, some embodiments can provide EPGs for a variety of devices in addition to conventional television distribution equipment. Such devices can include, without limitation, different types of computing devices, such as personal computers, laptop computers, and the like; portable and/or handheld devices, such tablet computers, personal digital assistants, music players, smart phones and the like; gaming systems, such as game consoles, handheld gaming systems, and the like; and/or any other type of device that can be capable of displaying and/or utilizing the enhanced EPGs described herein.

In an aspect, some embodiments obtain data (e.g., from the Internet) about a program listed on an electronic program guide and integrate that data with electronic program guide. Merely by way of example, one embodiment might include functionality for obtaining data from one or more sources; such sources might make data available to the public or might maintain proprietary data, which the operator of the EPG (e.g., a television distribution provider) might obtain via a relationship (contractual or otherwise) with a provider of the data. This functionality might be implemented as an application programming interface ("API") in some embodiments; in other embodiments the functionality might be implemented as a web service (which could also be considered an API in some implementations) or any other type of data exchange facility (e.g., an eXtensible Markup Language ("XML") data bus and/or the like). In some embodiment, the system might obtain the data by actively acquiring the data; in other embodiments, the system might act as a passive recipient of the data in order to obtain the data.

In a particular aspect of certain embodiments, such information (referred to herein as "enhanced metadata") can be obtained and/or updated dynamically, in real-time or near real-time. In such embodiments, for example, up-to-date information can be provided in the EPG, rather than requiring the viewer to tune to an information channel or view static data that might be. Merely by way of example, an embodiment might display an EPG having a program listing for a baseball game or other sporting event. The system might obtain, and provide with the program listing, statistics or other information about the sporting event, such as the current score of the game, the game situation (inning, number of outs, runners on base, balls and strikes, etc.), current pitcher and batter, etc. Such information can be continually refreshed in the EPG, so that the viewer can tell at a glance whether the game might be worth watching and/or can perceive information quickly without having to tune to the game. Similarly, dynamic information can be provided about any number of different types of program listings, such as comedies, dramas, news programs, and/or the like. Hence, a variety of different types of enhanced metadata can be provided through an EPG. For example, with regard to a broadcast television program or a movie, the enhanced metadata might include one or more published reviews of the television program or movie (e.g., reviews from popular review sites, such as Rottentomatoes.com™).

In another aspect of some embodiments, the system can provide a generalized electronic program guide that can be rendered by the system to be displayed on a plurality of different devices (including without limitation the devices described above, such as televisions, personal computers, tablet computers, wireless phones, and the like). In such embodiments, for example, the system can provide generate an enhanced EPG in a standard format and then render it for display on different devices, each of which might have different display capabilities (resolution, etc.), user interface (remote control, keyboard and mouse, touch interface, etc.). Based on the capabilities of the device, the rendered EPG might have more or less functionality, such as allowing the selection of a program and tuning the device to the program, tuning another device to the selected program, exploring enhanced metadata with a different device, and/or the like. For instance, in one embodiment, a viewer might be able to select a program listing on one device (such as a set top box) and have enhanced metadata about that program sent to another device (such as a wireless phone or tablet computer). Likewise, selection of a program listing on one device (such as a wireless phone or tablet computer), might cause another device (such as a set top box) to tune to the selected program listing.

Turning now to the figures, FIG. 1 illustrates a system 100 in accordance with one set of embodiments. The system 100 is depicted functionally, and it can be implemented using a variety of hardware arrangements. Merely by way of example, in some cases, the system 100 might be implemented on a single computer (such as a middleware server in an IPTV network, a set-top box in communication with a television distribution network, etc.), as a plurality of computers, etc. The functionality attributed to various components of the system 100 can be distributed and/or aggregated as appropriate in different embodiments. Merely by way of example, in some cases, certain components of the system 100 might be implemented in a set-top box. By the same token, the functions ascribed herein to various components of the system 100 can be arranged differently; for instance, the functions ascribed to a plurality of components might be performed by a single component in other embodiments, and/or the functions ascribed to a single component might be performed by a plurality of components in other embodiments.

The system 100 includes a receiver module 105 that obtains an EPG feed from an EPG source 110, which might be a third party EPG data provider. In some embodiments, this function can be performed in conventional fashion. The system 100, however, can include metadata, both metadata 115 generated by the system (and/or obtained from the EPG source 110, etc.) and external metadata 120 (also referred to herein as "enhanced metadata"). In one aspect, the difference between the metadata 115 and the external metadata 120 can be that the metadata 115 is generated for use with an EPG in conventional fashion, while the external metadata 120 was originally generated for another purpose and/or is pre-existent, such that the system 100 repurposes the external metadata 120 and integrates it with the EPG, as described in further detail herein. For example, in an aspect, the metadata 115 might be static metadata that includes information about program guide listings, such as rating information, program descriptions, and the like, which might be obtained from the EPG source 110 or another source. In a different aspect, the external metadata 120 might be data that is obtained dynamically by the system 100 and therefore can be updated more readily (e.g., in real-time or near real-time) than the metadata 115, which might require an updated feed from the EPG source 110.

In the illustrated embodiment, the system 100 comprises an integrator module 130 that integrates the metadata 115 and/or the external metadata 120 with the EPG feed. (As noted above, some or all of the metadata 115 might be obtained with the EPG feed itself, such that it need not be integrated with the EPG feed. Conversely, because the external metadata 120 was not designed for use with an EPG, that metadata 120 generally will be integrated by the integrator module 130). One technique for integrating the metadata is described in further detail below. The system 100 might also include an EPG formatter module 135, which formats an EPG from the EPG feed and the integrated metadata.

Conventionally, a broadcast television system provides an EPG for televisions connected to the system, e.g., via a set-top box in communication with the system head-end. In a novel aspect of some embodiments, the system 100 can provide an EPG for a variety of devices in addition to the television/set-top box. In such embodiments, the system 100 can include a renderer module, which renders a graphical display of the EPG for a plurality of devices. Such devices can include, without limitation, a set-top box 150 and/or a television 155 (which might communicate with the system directly and/or through the set-top box 150), a game console 160, an iPhone 165 or other device running an EPG app, a personal computer ("PC") 170 (which might display the EPG in a web browser and/or a dedicated application), and/or a mobile device 175 without an EPG app (which might display the EPG in a mobile web browser, etc.). In an aspect, the renderer module 140 can render the EPG according to the display characteristics and/or input/output characteristics of the specific devices.

In a novel aspect of other embodiments, the system 100 includes an application programming interface ("API") 180 that receives or otherwise obtains the external metadata. In some embodiments, the API provides a standardized interface to obtain the metadata 120 (e.g., via the Internet 190) from a variety of data sources 195. Such data sources can include, for example, providers such as Major League Baseball 195a or other direct data sources (which might provide, e.g., real-time or near real-time information about ongoing events, such as box scores for a baseball game; current pitcher/batter information; game status information, such as current inning, balls, strikes, outs, men on base, etc.; detailed biographical information about players, etc.). Data sources can also include indirect sources, such as blogs 195b, social media sites 195c, and/or results from Internet searches 195d, to name a few examples. Metadata 120 from any of these sources 195 can be included in the EPG, to provide dynamically updated information to the subscriber in the EPG, without requiring the subscriber to actually tune to a channel.

Figure 2:
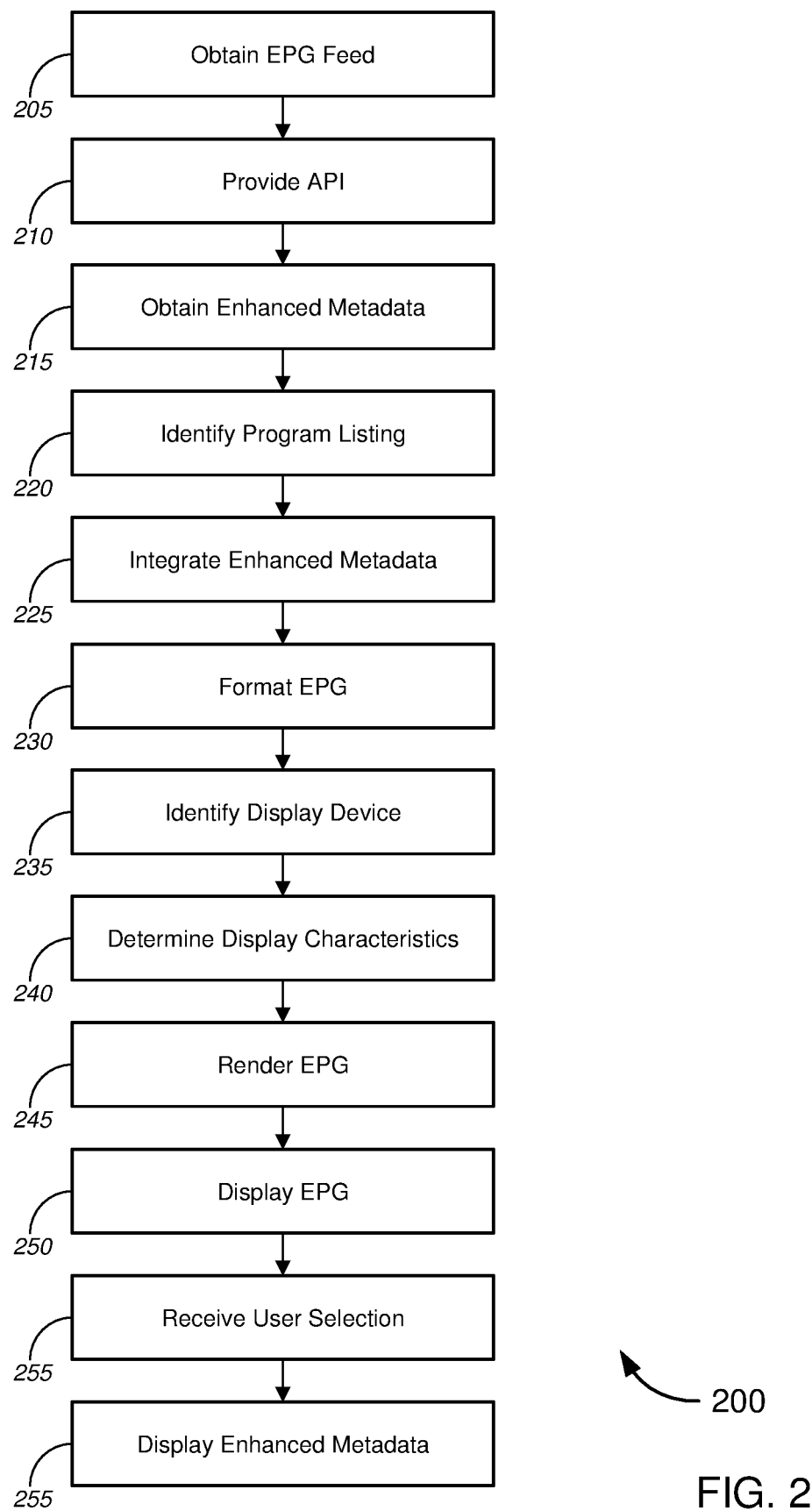
FIG. 2 is a process flow diagram illustrating a method of providing electronic program guides with enhanced metadata in accordance with various embodiments.

FIG. 2 illustrates a method 200 that can be used to provide an EPG with enhanced metadata. While the techniques and procedures of FIG. 2 are depicted and/or described in a certain order for purposes of illustration, it should be appreciated that certain procedures may be reordered and/or omitted within the scope of various embodiments. Moreover, while the method 200 illustrated by FIG. 2 (and/or various operations thereof) can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the method 200 illustrated by FIG. 2 (e.g., by executing instructions embodied on a computer readable medium), the system 100 can also operate according to other modes of operation and/or perform other suitable procedures.

The method 200 comprises, in an embodiment, obtaining an EPG feed (block 205). In one aspect, the system (and/or a receiver module thereof) might obtain an EPG feed from a third party source, such as a commercial EPG provider. In another aspect, the system (or another component of the television provider's system) might generate the EPG feed and provide it to the receiver module. In either case, the EPG feed can include standard information, such as program listings for all programs (which can include prerecorded programs, news programs, sports programs and other live events, etc.), information about the programs (channel information, start and stop times for each program, brief descriptions of programs, ratings, etc.), and/or the like. Programs included in the EPG feed can include scheduled broadcast programs, on demand programs, etc.

In some cases, the method comprises providing an API for adding enhanced metadata to the EPG feed (block 210). In aspect, the API can provide a standardized interface for exchanging data with metadata sources. The API might comprise a web service and/or XML interface through which a third party (or another system component) can provide metadata generated outside the system. Alternatively and/or additionally, the API might function to actively obtain metadata, for example as described below.

In some embodiments, the API can allow of customization of EPG metadata (e.g., based on subscriber preferences), such that different external metadata can be obtained for different subscribers, depending, for example, upon the subscriber's stated (and/or observed) preferences about the amount of metadata to be provided in the EPG and/or the subscriber's stated (and/or observed) preferences about which programs or types of programs should have associated metadata. For instance, one subscriber might indicate, through express user input, that he would like as much metadata is available for every program, while another subscriber might indicate, through express user input, that she would not like any enhanced metadata to be displayed in the EPG. Alternatively and/or additionally, these preferences might be observed by the system based on user interaction with metadata in the EPG, such that, over time, a subscriber who interacts more often with metadata is provided with relatively more metadata than one who does not. Likewise, one subscriber might indicate (expressly and/or implicitly through behavior) that she prefers metadata for sports programs but not movies, while another subscriber might indicate (either expressly and/or implicitly through behavior) that he prefers metadata for movies and news programs but not sports. Such preferences can be used by the API to determine what types and/or amounts of metadata to obtain for integration with the EPG.

At block 215, the method can include obtaining enhanced metadata. In an aspect, this metadata might pertain to a particular broadcast television program. A variety of techniques can be used to obtain the enhanced metadata. Merely by way of example, in some cases, the system might receive the enhanced metadata via the API and/or as a data feed from a third party (such as a sports information provider). In some cases, the API can passively receive metadata, while in other cases, the API might actively obtain the metadata. In a particular set of embodiments, the system might include (or be in communication with, e.g., via the API) a data engine that actively obtains data, e.g., from the Internet. For example, the data engine might perform automated Internet searches (e.g., using standard search engines) for information related to particular television programs that are included in the EPG feed, for instance by using the program title (or other program information) as keywords for the searches; in one aspect, the search results can be passed to the system through the API.

In an aspect of certain embodiments, once the system has obtained enhanced metadata, the system associates that metadata with one or more particular program listings. Accordingly, the method 200 can include identifying one (or more) of a plurality of program listings that correspond to the television program to which the metadata pertains (block 220). Any of a variety of attributes about the program, such as asset ID, asset/program title, actor names, and/or the like, can be used as a key to identify program(s) to which the metadata pertains.

At block 225, the method 200 comprises integrating the enhanced metadata with the EPG feed. In a particular aspect, the enhanced metadata might be integrated with the identified program listing for the television program corresponding to the metadata. (In some cases, a single program might have multiple program listings, such as when a program is broadcast on multiple channels and/or rebroadcast at different times; in such cases, the metadata might be integrated with each listing, and/or a link might be established between a single instance of the metadata and each listing.)

A variety of different types of enhanced metadata can be provided by the system, and by the same token, a variety of different techniques can be used to integrate the enhanced metadata with the EPG (and/or a program listing therein). Merely by way of example, in some cases, the enhanced metadata might include textual information, such as movie reviews, actor biographies, sports statistics, and/or the like. In such cases, integrating the enhanced metadata with the EPG can comprise inserting the textual information into the EPG; alternatively and/or additionally, this textual information can be associated with a particular program listing that corresponds to the television program to which the information pertains. In other cases, the enhanced metadata might include graphical information, which can include, inter alia, photographs, computer-generated graphics, video clips, and/or the like, and integrating graphical metadata with the EPG can include inserting that graphical information into the EPG and/or associating the graphical information with one or more program listings.

In some cases, it may be preferable to insert a hyperlink into a program listing, rather than the metadata itself. Merely by way of example, enhanced metadata can be quite voluminous in certain circumstances, and inclusion of the metadata in a program listing might be infeasible and/or might detract from the usability of the EPG. In such cases, the system might merely insert a hyperlink into a program listing and associating the hyperlink with the metadata. When the subscriber selects the hyperlink (for example, as described in further detail below), the system can present the metadata to the subscriber. The use of a hyperlink can, in some instances, allow the system to provide real-time, or near real-time, information to the subscriber, through the EPG.

For instance, in the context of a baseball game, a program listing for the game might include a hyperlink that the user can select to obtain real-time, or near real-time, statistics about that game. Merely by way of example, the system might obtain (e.g., through the API), up-to-date statistics and/or other information and display that up-to-date information on the EPG. In this way, the subscriber can obtain information in the EPG without having to actually tune to the baseball game. (Of course, such functionality can also be implemented without the use of a hyperlink in the program listing. For example, the system might obtain the same up-to-date information when the subscriber pages to the program listing in the EPG, and such information might that be displayed along with the program listing—for instance, in a sidebar—without requiring the user to select a hyperlink.)

In the illustrated embodiment, the method 200 comprises formatting an EPG from the EPG feed (block 230). In an aspect, the formatted EPG includes the metadata that is integrated with the EPG feed and/or the individual program listings. As a general matter, formatting the EPG can include any operations that prepare an EPG to be rendered for display on a generic display screen and/or display screen of a specific size/resolution. Merely by way of example, formatting the EPG can comprise organizing visual elements of the EPG feed and/or associated enhanced metadata into a desired ordering, laying out a graphical display for the EPG, and/or the like.

In a particular aspect, formatting an EPG can comprise defining a spatial relationship (on a display screen) between program listings (and/or other EPG elements) and enhanced metadata that is associated with those listings/elements. The spatial relationship between program listings and associated enhanced metadata can vary among different EPG's and/or within a single EPG. Merely by way of example, in some cases, if the EPG is organized in a grid layout (e.g., with rows corresponding to different channels and columns corresponding to different time slots), enhanced metadata for a particular program listing might be included within the grid cell for that program listing. Alternatively and/or additionally, enhanced metadata might only be displayed when a program listing of selected. Merely by way of example, the format of the EPG might reserve a particular screen region (e.g., a corner of the screen; quarter of the screen; half of the screen; top, bottom, and/or side of the screen, etc.). When a program listing with enhanced metadata is selected on the EPG, that region might show the enhanced metadata. Alternatively and/or additionally, the enhanced metadata might be shown in a window (along with, and/or as an alternative to, detailed program information provided with the EPG feed) when the user requests detailed information about a program. In some cases, if the enhanced metadata is to be provided via a hyperlink, formatting the EPG might include inserting the hyperlink into the program listing (e.g., directly in the listing, in a region reserved for metadata, as described above, or the like).

As noted above, certain embodiments can support multiple different types of display devices (including without limitation those noted above) and/or can render the EPG differently according to the characteristics of each device. Hence, in an embodiment, the method 200 can comprise identifying a display device, from among a plurality of possible display devices, on which the EPG should be rendered (block 235). A number of techniques can be used to identify a display device. Merely by way of example, if the display device is a television in communication with the set-top box, the set-top box might be addressable by a middleware server or other device in the television distribution network, such that the middleware server can assume that the set-top box will be responsible for displaying the EPG. With regard to other display devices (such as PCs, tablet computers, smart phones, and/or the like), the subscriber might register such devices with the middleware server and/or another device in the television distribution network. Such registration can include addressing information (e.g., an IP address, hostname, etc.) and/or display characteristics of each such device. In some cases, for instance, the subscriber might identify a device by make and model, identify the device as a web browser, and/or the like.

In other cases, a display device might run an application and/or an app that automatically registers itself with television distribution network.

The system, then, can receive a request from a display device (e.g., based on a request sat the device from the subscriber), and if that advice has been registered and/or is capable of identifying itself to the system, the system can identify the device as being a recipient of the EPG. Alternatively and/or additionally, the system (and/or component therein, such as the middleware server) might periodically distribute EPGs to a number of different registered devices and might identify such devices, e.g., based on registrations, prior to distribution of the EPGs.

The method 200 can further include determining a set of display characteristics and/or user interface characteristics for the display device (which might be identified as described above) on which the EPG should be rendered (block 240). As noted above, with respect to set-top boxes, the system might be aware of such devices and the standard resolutions (e.g., SDTV, 720p, 1080i, 1080p, etc.) of televisions that might be attached to the set-top box. Similarly, the user interface characteristics of the set-top box might be standardized (e.g., input by remote control) and known by the system. With regard to other devices, also as noted above, such devices might be registered with the system, and the display and user interface characteristics of such display devices might be identified by the system at the time of restriction, e.g., by lookup from the table of known makes and models of devices and/or based on user input. Hence, in many cases, the display and/or user-interface characteristics of a particular display device can be determined by reference to the subscriber's profile once the display device is been identified. With regard to browser-based display devices, the display and/or user interface characteristics may be determined by the system based on user agent strings and/or other information provided by the browser in a request for the EPG.

At block 245, the method 200 comprises rendering a graphical display of the EPG for display on a display device. In one aspect, the system (and/or a component thereof, such as a renderer module) might render the graphical display to accommodate any determined display characteristics of the display device on which the EPG is to be displayed. As a general matter, rendering the graphical display of the EPG for the selected device can comprise producing a bitmap and/or other graphical image corresponding to the display characteristics (e.g., screen resolution) and/or user input devices supported by the selected display device. Hence, the same EPG format might be displayed differently on a smart phone, a tablet, and television in communication with a set-top box, in order to maximize the user experience on each device.

At block 250, the method 200 can comprise displaying the rendered graphical display of the EPG on the selected display device. The rendered graphical display can include the enhanced metadata. The appearance of the enhanced metadata in the graphical display can depend on the technique used to integrate the enhanced metadata and/or the characteristics of the display device.

In an aspect, the system might cause the display device (which might or might not be considered part of the system) to display the graphical display, for example, by sending graphical data to the display device to be displayed by a dedicated application and/or a browser on the display device. In other cases, a set-top box (which, again, might or might not be considered part of the system) might send video data (e.g., via an HDMI cable, component connection, etc.) to a television to cause the television to display the graphical display of the EPG.

As noted above, in some cases, the enhanced metadata might be integrated with the EPG (and/or a program listing therein) by including a hyperlink with the program listing. Accordingly, the method 200 might include receiving a user selection of the hyperlink (block 255). The nature of the user selection often will depend on the type of display device on which the graphical display of the EPG is rendered. Merely by way of example, if the EPG is being displayed on a television via a set-top box, the selection may be performed by the subscriber highlighting the hyperlink using cursor keys on the remote control and pressing a select or enter button on the remote control to select the hyperlink. Alternatively and/or additionally, the remote control might be customized to include a specific button that is configured to select a hyperlink corresponding to a program listing currently highlighted on the EPG. With regard to other display devices, the nature of the selection can depend on the capabilities of the device. For example on a tablet device or smartphone with a touchscreen, the selection of the hyperlink may comprise the subscriber touching hyperlink on the screen, and on a PC, selection of the hyperlink that comprise clicking on the link with a mouse or other pointing device. The display device can communicate that user input to the system, which receives the user input and interprets it as a selection of the hyperlink.

At block 255, the method 200 can include can include displaying the enhanced metadata (and/or causing a display device to display the enhanced metadata). In some cases, the enhanced metadata will be displayed by default in the EPG, e.g., when the EPG is displaying a program listing with which enhanced metadata has been integrated. In other cases, the enhanced metadata might be displayed in response to receiving a user selection of a hyperlink associated with a particular program listing. In one aspect, the enhanced metadata might be displayed on the display device that displayed the graphical EPG itself.

In another aspect, however, the system might cause a different display device to display the enhanced metadata. As noted above, the subscriber might have a profile (which can be stored on the set-top box, at a middleware server, and/or it in the location in the television provider's network), and the profile might have stored therein a number of different display devices with which the system can communicate. The subscriber might prefer to view the enhanced metadata on a different device than the device displaying the EPG, for example to allow the subscriber to watch a television program on one device and review the enhanced metadata on different device at the same time.

In one aspect, this behavior can be induced by user input. Merely by way of example, if the EPG is displayed on a television via a set-top box, when the subscriber selects the hyperlink, the subscriber might be presented with an option to display the enhanced metadata on the television set or to display the enhanced metadata on a different device. Alternatively and/or additionally, the subscriber's profile might include configuration information indicating a preference for a particular display device (e.g., one of the display devices registered with the system) to which enhanced metadata should be sent, and/or the user might be provided with the ability to configure that behavior on a per-session basis at the set-top box. In an aspect, because the display device to which the enhanced metadata is to be sent is registered with the system, the system can address the display device and can provide the enhanced metadata, properly formatted and rendered for that display device's characteristics, to the device (and/or an application or web browser thereon).

As noted above, the method 200 can be performed by a single computer system (such as a middleware server, set-top box, etc.) and/or by multiple computer systems in conjunction. Merely by way of example, in some cases, a middleware server (or other television distribution system head end equipment) might obtain the EPG feed and metadata, integrate the metadata with the EPG feed, and format the EPG. A set-top box then, might render the graphical display of the EPG, cause the display of the rendered EPG, and/or perform user interaction operations. In other cases, the set-top box might perform the rendering for a television set, while the middleware server (and/or a web server in communication therewith) performs the rendering for other devices, such as PCs, tablet computers, smart phones, etc. The middleware server and/or web server might provide user interaction with such devices as well.

A number of different configurations are possible. For example, in one embodiment, a middleware server might prepare and format an EPG with integrated metadata (e.g., as described above) and provide that EPG to a set-top box to be rendered and displayed on a television set. Upon receiving user selection (e.g., with a remote control) of a hyperlink to enhanced metadata, the set-top box might communicate that user selection to the middleware server, which causes a tablet computer to display the enhanced metadata (e.g., through an app or a web browser on the tablet computer). The middleware server might include or otherwise utilize a web server to send data to the tablet computer to cause the display of the enhanced metadata.

As noted above, the system is capable of providing dynamically-updated (e.g., real-time or near real-time) metadata through the EPG. Hence, in an aspect, whenever a subscriber activates the EPG (on a set-top box or other device), the system might perform the actions of obtaining up-to-date metadata, integrating the metadata, formatting the EPG, rendering the EPG, and causing the display of the EPG.

Alternatively and/or additionally, when the subscriber selects a particular program having associated metadata (or selects a hyperlink to view metadata), the system might obtain updated metadata and integrate it with the program listing prior to displaying the listing (or displaying the metadata in response to the subscriber request). Similarly, when the system obtains updated metadata (e.g., from a third party provider, through the API, the displayed EPG can be refreshed to include the updated metadata.

Figure 3:
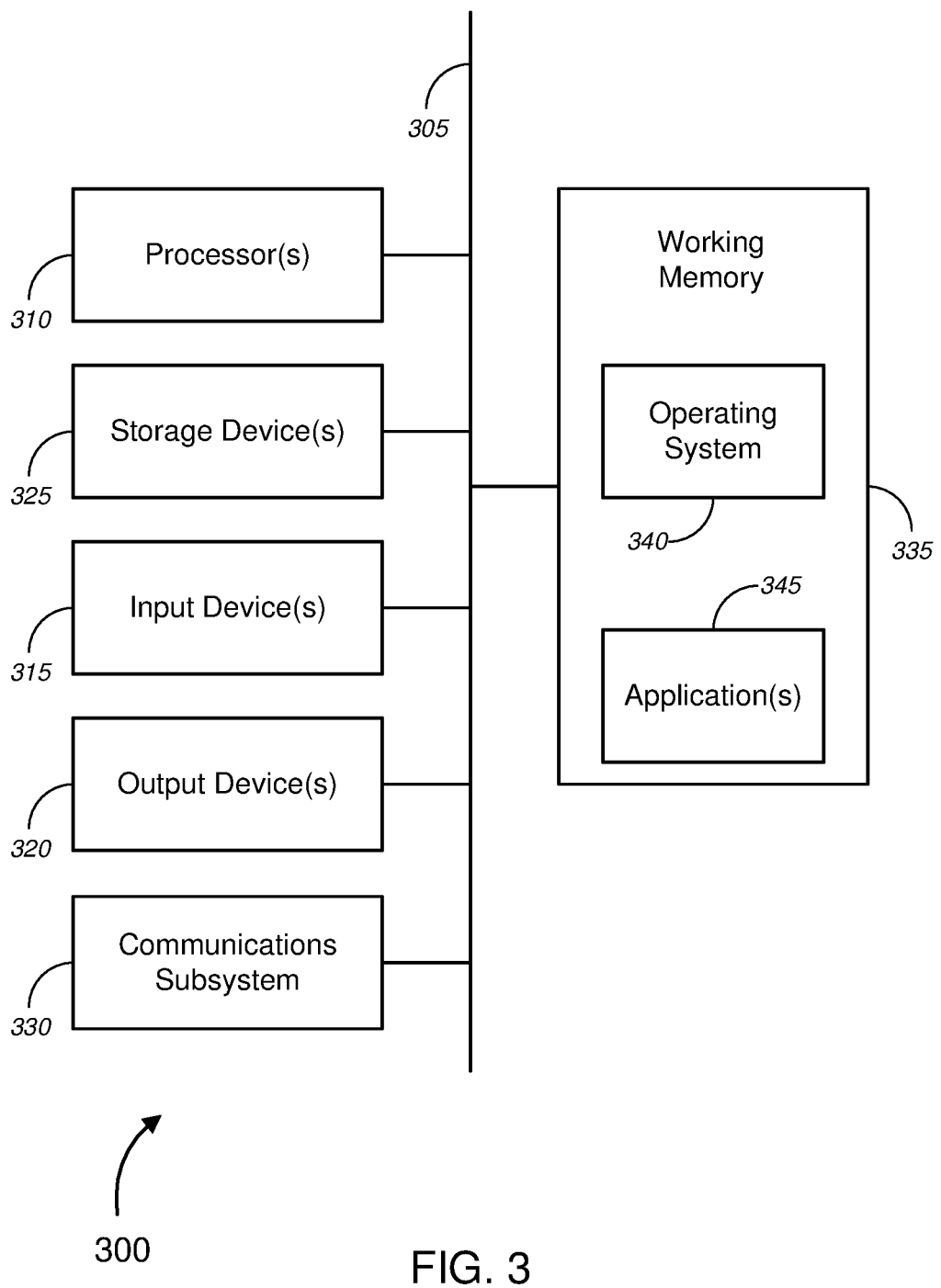
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as the computer system of FIG. 1, and/or as a middleware server, set-top box, and/or display device. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation audio and/or video input/output (e.g., component input/output, HDMI input/output, and/or the like). The communications subsystem might further comprise a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
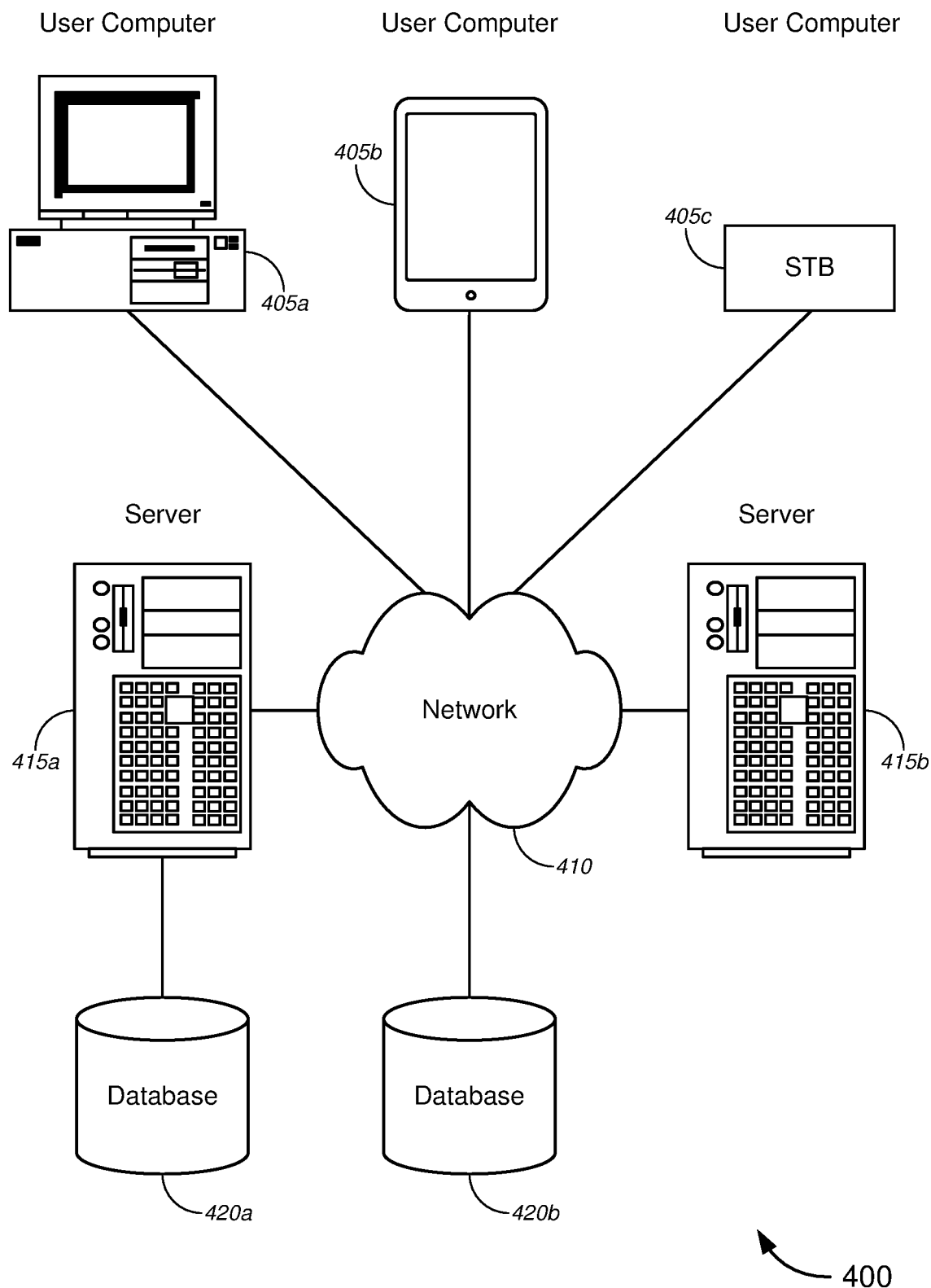
FIG. 4 is a block diagram illustrating a networked system of computers, which can be used in accordance with various embodiments.

As noted above, a set of embodiments comprises systems for providing EPGs with enhanced metadata. FIG. 4 illustrates a schematic diagram of a system 400 that can be used in accordance with one set of embodiments. The system 400 can include one or more user computers 405, which can function as display devices in accordance with various embodiments. A user computer 405 can be a general purpose personal computer 405a, a tablet computer or smart phone 405b (including, merely by way of example, tablet computers, handheld computers, and the like, running any appropriate operating system, several of which are available from vendors such as Apple, Microsoft Corp., and the like) and/or a workstation computer running any of a variety of commercially-available UNIX™ or UNIX-like operating systems, and/or a set-top box 405c. A user computer 405 can also have any of a variety of applications, including one or more applications configured to perform operations (such as rendering and/or display operations) in accordance with methods provided by various embodiments (as described above, for example), as well as one or more office applications, database client and/or server applications, and/or web browser applications. Alternatively, a user computer 405 can be any other electronic device, such as a thin-client computer, Internet-enabled mobile telephone, and/or personal digital assistant, capable of communicating via a network (e.g., the network 410 described below) and/or of displaying and navigating EPGs, web pages or other types of electronic documents. Although the exemplary system 400 is shown with three user computers 405, any number of user computers can be supported.

Certain embodiments operate in a networked environment, which can include a network 410. The network 410 can be any type of network familiar to those skilled in the art that can support data communications using any of a variety of commercially-available (and/or free or proprietary) protocols, including without limitation TCP/IP. Merely by way of example, the network 410 can include a television distribution network (such as a cable television network, a VDSL network, an IPTV network, etc.), a local area network ("LAN"), including without limitation a fiber network, an Ethernet network, and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a middleware server configured to provide conventional television distribution services (such as IPTV services) to a plurality of subscribers. The middleware server can also be configured to operate as the system 100 of FIG. 1 (and/or as various components thereof) and/or to perform some or all of the EPG generation procedures described with respect to the method 200 of FIG. 2.

Another server 415 might be a web server, which can be used, merely by way of example, to process requests for web pages or other electronic documents from user computers 405 (including providing an EPG to a browser on a user computer). The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention. The web server might be integrated with, or in communication with, a middleware server. It should be noted that the functions described with respect to various servers herein can be performed by a single server and/or a plurality of specialized servers, depending on implementation-specific needs and parameters.

In certain embodiments, the system can include one or more databases 420, which can be used to store enhanced metadata, EPG feeds, subscriber and/or display device profiles, and/or the like. The location of the database(s) 420 is discretionary: merely by way of example, a database 420a might reside on a storage medium local to (and/or resident in) a server 415 (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
obtaining, with a computer, an electronic program guide ("EPG") feed, the EPG feed comprising a plurality of program listings of broadcast television programs, wherein a set-top comprises the computer;
providing, with the computer, an application programming interface ("API") for adding enhanced metadata to the EPG feed;
obtaining, with the API, the enhanced metadata pertaining to a broadcast television program, wherein the enhanced metadata is obtained from at least two different sources, wherein the at least two different sources are remote from the computer;
identifying, with the computer, one of the plurality of program listings corresponding to the broadcast television program;
integrating, with the computer, the enhanced metadata from the at least two different sources with the identified program listing, wherein integrating the enhanced metadata with the identified program listing further comprises inserting a hyperlink into the EPG feed and associating the hyperlink with the identified program listing;
formatting, with the computer, an EPG from the EPG feed, the EPG including the integrated enhanced metadata from the at least two different sources;
rendering, with the computer, a graphical display of the EPG having the integrated enhanced metadata for display on a display device;
causing the display device to display the graphical display of the EPG;
receiving, with the display device, a user selection of the hyperlink displayed within the graphical display of the EPG;
in response to receiving the user selection of the hyperlink displayed within the graphical display of the EPG, dynamically updating real-time or near real-time metadata associated with the hyperlink and the enhanced metadata, obtaining the dynamically updated real-time or near real-time metadata associated with the hyperlink and the enhanced metadata, and displaying the dynamically updated real-time or near real-time metadata associated with the hyperlink and the enhanced metadata on a second device, wherein the second device is different from the display device;

receiving additional updated enhanced metadata with the API from a third party provider; and in response to receiving the additional updated enhanced metadata with the API from the third party provider, causing the display device to refresh the graphical display of the EPG to include the additional updated enhanced metadata from the third party provider.

2. The method of claim 1, further comprising determining a set of display characteristics for the display device, wherein rendering a graphical display of the EPG comprises rendering the graphical display guide to accommodate the set of display characteristics.

3. The method of claim 2, wherein determining the set of display characteristics comprises identifying the display device from among a plurality of display devices.

4. The method of claim 3, wherein the plurality of display devices comprises two or more display devices selected from the group consisting of a television, a personal computer, a tablet computer, a wireless phone, and a remote control device.

5. The method of claim 1, wherein obtaining the enhanced metadata comprises obtaining information from the Internet.

6. The method of claim 5, wherein the information from the Internet comprises at least one search result from an automated Internet search pertaining to the broadcast television program.

7. The method of claim 1, wherein obtaining the enhanced metadata comprises receiving a data feed from the third party provider.

8. The method of claim 1, wherein the broadcast television program is a movie, and wherein the enhanced metadata comprises a television or movie review.

9. The method of claim 1, wherein the enhanced metadata comprises user comments about the broadcast television program.

10. The method of claim 1, wherein the broadcast television program comprises a sporting event, and wherein the enhanced metadata comprises statistics about the sporting event.

11. The method of claim 1, wherein integrating the enhanced metadata with the identified program listing comprises inserting textual information into the electronic program guide and associating the textual information with the identified program listing.

12. The method of claim 1, wherein integrating the enhanced metadata with the identified program listing comprises inserting graphical information into the electronic program guide and associating the graphical information with the identified program listing.

13. The method of claim 12, wherein the graphical information comprises one or more video clips.

14. An apparatus, comprising:

a non-transitory computer readable medium having encoded thereon a set of instructions executable by one or more computers of a set-top box to:

obtain an electronic program guide ("EPG") feed, the EPG feed comprising a plurality of program listings of broadcast television programs;

provide an application programming interface ("API") for adding enhanced metadata to the EPG feed;

obtain, with the API, the enhanced metadata pertaining to a broadcast television program, wherein the enhanced metadata is obtained from at least two different sources, wherein the at least two different sources are remote from the one or more computers;

identify one of the plurality of program listings corresponding to the broadcast television program;

integrate the enhanced metadata from the at least two different sources with the identified program listing, wherein integrating the enhanced metadata with the identified program listing further comprises inserting a hyperlink into the EPG feed and associating the hyperlink with the identified program listing;

format an EPG from the EPG feed, the EPG including the integrated enhanced metadata;

render a graphical display of the EPG having the integrated enhanced metadata for display on a display device;

cause the display device to display the graphical display of the EPG;

receive a user selection of the hyperlink displayed within the graphical display of the EPG;

in response to receiving the user selection of the hyperlink displayed within the graphical display of the EPG, dynamically update real-time or near real-time metadata associated with the hyperlink and the enhanced metadata, obtain the dynamically updated real-time or near real-time metadata associated with the hyperlink and the enhanced metadata, and display the dynamically updated real-time or near real-time metadata associated with the hyperlink and the enhanced metadata on a second device, wherein the second device is different from the display device;

receive additional updated enhanced metadata with the API from a third party provider; and in response to receiving the additional updated enhanced metadata with the API from the third party provider, cause the display device to refresh the graphical display of the EPG to include the additional updated enhanced metadata from the third party provider.

15. A computer system of a set-top box, comprising:

one or more processors; and a non-transitory computer readable medium in communication with the one or more processors, the computer readable medium having encoded thereon software executable by the computer system to perform one or more operations, the software comprising instructions executable by the one or more processors to:

obtain an electronic program guide ("EPG") feed, the EPG feed comprising a plurality of program listings of broadcast television programs;

provide an application programming interface ("API") for adding enhanced metadata to the EPG feed;

obtain, with the API, the enhanced metadata pertaining to a broadcast television program, wherein the enhanced metadata is obtained from at least two different sources, wherein the at least two different sources are remote from the one or more computers;

identify one of the plurality of program listings corresponding to the broadcast television program;

integrate the enhanced metadata from the at least two different sources with the identified program listing, wherein integrating the enhanced metadata with the identified program listing further comprises inserting a hyperlink into the EPG feed and associating the hyperlink with the identified program listing;

format an EPG from the EPG feed, the EPG including the integrated enhanced metadata;

render a graphical display of the EPG having the integrated enhanced metadata for display on a display device;

cause the display device to display the graphical display of the EPG;

receive a user selection of the hyperlink displayed within the graphical display of the EPG;

in response to receiving the user selection of the hyperlink displayed within the graphical display of the EPG, dynamically update real-time or near real-time metadata associated with the hyperlink and the enhanced metadata, obtain the dynamically updated real-time or near real-time metadata associated with the hyperlink and the enhanced metadata, and display the dynamically updated real-time or near real-time metadata associated with the hyperlink and the enhanced metadata on a second device, wherein the second device is different from the display device;

receive additional updated enhanced metadata with the API from a third party provider; and in response to receiving the additional updated enhanced metadata with the API from the third party provider, cause the display device to refresh the graphical display of the EPG to include the additional updated enhanced metadata from the third party provider.

16. The method of claim 1, further comprising: displaying the enhanced metadata when a program listing of the plurality of program listings associated with the metadata is selected, wherein the enhanced metadata is displayed on at least one of a corner of a screen of the display device, a quarter of the screen of the display device, or a half of the screen of the display device.

17. The method of claim 1, wherein, when a single program has multiple program listings within the EPG, a link is established between a single instance of metadata associated with the single program and each program listing of the single program.

* * * * *